United States Patent [19]

Trzecieski

[11] 4,374,861
[45] Feb. 22, 1983

[54] LACTOSE-REDUCED ICE CREAM AND PROCESS FOR THE PRODUCTION THEREOF

[75] Inventor: Jan Trzecieski, Naerum, Denmark

[73] Assignee: Kirk Chemicals A/S, Troeroed, Denmark

[21] Appl. No.: 261,005

[22] Filed: May 6, 1981

[30] Foreign Application Priority Data

May 22, 1980 [DK] Denmark ............................. 2234/80

[51] Int. Cl.³ .......................... A23G 9/00; A23C 9/12
[52] U.S. Cl. ....................................... 426/42; 426/565
[58] Field of Search ................... 426/42, 34, 565, 566, 426/567

[56] References Cited

U.S. PATENT DOCUMENTS

| | | | |
|---|---|---|---|
| 1,415,715 | 5/1922 | Sanna | 426/42 |
| 1,737,101 | 11/1929 | Turnbow | 426/42 |
| 2,668,765 | 2/1954 | Stimpson | 426/42 |
| 2,681,858 | 6/1954 | Stimpson | 426/42 |
| 2,738,279 | 3/1956 | Stimpson | 426/565 |
| 2,749,242 | 6/1956 | Stimpson | 426/42 |
| 2,767,098 | 10/1956 | Fear | 426/42 |
| 2,826,503 | 3/1958 | Roberts et al. | 426/42 |

*Primary Examiner*—Jeanette M. Hunter
*Attorney, Agent, or Firm*—Fidelman, Wolffe & Waldron

[57] ABSTRACT

A high-quality ice cream and process and composition for the production of high-quality ice cream on the basis of fats, a quantity from about 4 to about 10 percent by weight of milk solid non-fat, a quantity from about 4 to about 10 percentages by weight of lactose, sugars, stabilizers, emulsifying agents, lactase, optionally aromas and/or coloring matters, and water, by which process the ingredients, except the fats, are mixed and kept at a temperature of from about 30° to about 50° C. for a period from about 1 to about 3 hours, whereafter the fats are added, and the mixture is pasteurized, homogenized, cooled, optionally ripened, and frozen, with addition of aromas and/or coloring matters as desired.

5 Claims, No Drawings

LACTOSE-REDUCED ICE CREAM AND PROCESS FOR THE PRODUCTION THEREOF

The present invention relates to a high-quality ice cream product and to a process for the production of a high-quality ice cream on the basis of fats, milk solid non-fat, sugars, lactase, stabilizers, emulsifying agents, optionally aromas and/or coloring matters, and water, by which process the ingredients are mixed, and the mixture is pasteurized, homogenized, cooled, optionally ripened, and frozen, with addition of aromas and/or coloring matters, if desired. Moreover, the invention relates to a composition for use in the production of high-quality ice cream.

It is generally known that ice cream consumers prefer products which have a pleasant creamy texture, are well swelled and have a desired stand up.

The improved freezer construction and cooling performance as well as the general tendency to consume ice cream just removed from the freezer, i.e., without any kind of previous warming, has created a demand for ice cream having a pleasant soft and creamy texture at low temperatures, for instance about $-15°$ C.

In order to comply with this demand, ice cream producers have tried to produce ice cream having the above-mentioned characteristics by using a high content of edible fats and a certain content of specially selected stabilizers and sugars. All these things make the production of ice cream having these desired characteristics rather expensive and, moreover, the high contents of sugars are inexpedient for nutritional reasons.

An apparatus for measuring the characteristics of ice cream does not exist; the evaluation of this property is made by special tasting panels consisting of well-trained specialists.

Ice cream is commonly produced by using the following ingredients:

| | |
|---|---|
| Fats | about 3–12% |
| MSNF | about 7–14% |
| Saccharose | about 10–20% |
| Monosaccharides | about 2–7% |
| Emulsifying/Stabilizing Combination | about 0.4–0.8% |
| Water up to | 100% |

The percentages stated above and below are all calculated on the basis of the total weight of the mixture.

In this context the term fats covers butter fat or vegetable fats.

MSNF stands for milk solid non-fat. Usually, concentrated skimmed milk or skimmed milk powder is used. MSNF mainly contains lactose, casein, globulin and albumin. It is known to replace 10–30% of MSNF by demineralized whey powder. Demineralized whey powder mainly contains lactose, globulin and albumin. This replacement gives a considerable economic gain, but simultaneously it involves a risk of producing a.o. sandy ice cream, i.e., ice cream containing lactose crystals.

It has been proposed to use lactase in the production of ice cream in order to avoid the crystallization of lactose in the ice cream. By modern methods of production it is however, in practice, possible to avoid this crystallization, and consequently, lactase is not used in the production of ice cream.

It was found that ice cream may be produced having a surprisingly high quality, i.e. a relatively soft ice cream having among other things a fine stand up, body and excellent creamy texture by partly replacing MSNF by lactose with the addition of lactase.

In accordance herewith the process according to the invention is characterized in that the ingredients, except the edible fats, are mixed with addition of lactase, and the mixture is kept at a temperature of from about 30° to about 50° C. for a period of from about 1 to about 3 hours, whereafter the fats are added, and that a quantity of from about 4 to about 10% by weight of milk solid non-fat, and a quantity of from about 4 to about 10% by weight of lactose are used, calculated on the total weight of the mixture.

The composition of the invention is characterized in comprising 80–90% by weight of lactose, 8–18% by weight of stabilizer/emulsifier and optionally 1% by weight of lactase, calculated on the total weight of the composition.

Different high-quality ice cream products can be produced by using for instance:

| | | |
|---|---|---|
| 1. | Butter or Vegetable Fats | 3% |
| | Skimmed Milk Powder | 10% |
| | Lactose | 5% |
| | Saccharose | 14% |
| | Lactase Preparation | 0.2% |
| | Emulsifying/Stabilizing Combination | 0.6% |
| | Water | 67.2% |
| or | | |
| 2. | Butter or Vegetable Fats | 12.5% |
| | Skimmed Milk Powder | 7% |
| | Lactose | 5% |
| | Saccharose | 12% |
| | Lactase Preparation | 0.2% |
| | Emulsifying/Stabilizing Combination | 0.5% |
| | Water | 62.8% |

The ice cream products produced by the process according to the invention do not only have a surprisingly high quality, but have also a nutritionally good composition since a substantial amount of the lactose (50–70%) has been hydrolyzed to glucose and galactose. Furthermore, the partial use of lactose instead of the more expensive MSNF offers great economic advantages, and the use of lactase also effects that smaller quantities of sugars may be used since a major part of the lactose is hydrolyzed into sweet monosaccharides.

By the process according to the invention a quantity of from about 4 to about 10% by weight of MSNF and from about 4 to about 10% by weight of lactose are used, as previously stated. After the addition of lactase the mixture is kept suited to enzymatic hydrolysis of lactose, namely at a temperature of from about 30° to about 50° C. for a period of from about 1 to about 3 hours, whereafter the edible fats are added prior to the pasteurization. Pasteurization deactiveates the lactase. The remaining process steps i.e., pasteurization, homogenization, cooling, optionally ripening, and freezing are carried out in a manner known per se in the production of ice cream, including as heretofore if desired, the addition of aromas and/or coloring matters to flavor the ice cream. When, by the process according to the invention, the mixture is kept at a temperature of from about 30° to about 50° C. for a period of from about 1 to about 3 hours prior to the pasteurization, the lactase causes hydrolysis of lactose to glucose and galactase to an extent of at least about 50%, 50 to 70% being preferred.

More generally, the proportions herein comtemplated are:

| | |
|---|---|
| Fats | about 3–12% |
| MSNF | 4–10% |
| Lactose | 4–10% |
| Saccharose | about 10–14% |
| Monosaccharides | about 2–4% |
| Emulsifiers & Stabilizers | about 0.5–0.7% |
| Water up to | 100% |

The invention is further illustrated in the following Examples, in which all percentages are percentages by weight calculated on the ready mixture.

EXAMPLE 1

A mixture was prepared of the following ingredients:

| | |
|---|---|
| Skimmed Milk Powder | 280 g |
| Lactose | 200 g |
| Saccharose | 480 g |
| Lactase Preparation (Lactozym ® 1500 L)* | 8 g |
| Emulsifying/Stabilizing Combination ("PANISOL" PI SUPER) | 20 g |
| Water | 2512 g |

*Aqueous lactase preparation containing 1500 LAU/ml.

The mixture was kept at a temperature of about 40° C. for about 2 hours with slow stirring, heated to about 50° C., 500 g of butter (water content 16%) was added, heated to about 70° C. and homogenized in a one-stage homogenizer at a pressure of about 160 kg/cm². The homogenized mixture was cooled to about 4° C. and kept at this temperature for about 6 hours. Then the mixture was frozen at about −4° C., and at the same time air was whipped in. Thereafter the mixture was hardened at about −20° to −30° C.

An ice cream was produced, the quality of which was evaluated by a well-trained tasting panel. A marking scale from 1 to 5 was used, according to which 5 covered the desired quality found in ordinary ice cream. The ice cream produced got the mark 5+, where + indicated an upward direction.

When using the above described process, however, replacing the butter by a corresponding quantity of vegetable fats (soya/coconut oil hardened to 42° C.) and by using a homogenizing pressure of 150 kg/cm², an ice cream was produced, which according to the evaluation of the tasting panel got the mark 5+.

COMPARATIVE EXAMPLE 1

A mixture was prepared of the following ingredients:

| | |
|---|---|
| Butter (water content 16%) | 500 g |
| Skimmed Milk Powder | 480 g |
| Saccharose | 480 g |
| Dextrose | 120 g |
| Emulsifying/Stabilizing Combination ("PANISOL" PI SUPER) | 20 g |
| Water | 2400 g |

The mixture was heated to a temperature of about 70° C. and homogenized in a one-stage homogenizer at a pressure of about 160 kg/cm². The homogenized mixture was cooled to about 4° C. and kept at this temperature for about 6 hours. Then the mixture was frozen at about −4° C., and at the same time air was whipped in. Thereafter the mixture was hardened at about −20° to −30° C.

An ice cream was produced, which by the tasing panel got the mark 3–4, corresponding to an acceptable ice cream.

When using the above described process, however, instead of butter using a corresponding quantity of vegetable fats (soya/coconut oil hardened to 42° C.) and using a homogenizing pressure of 150 kg/cm², an ice cream was produced which by the tasting panel got the mark 3–4, corresponding to an acceptable product.

EXAMPLE 2

A mixture was prepared of the following ingredients:

| | |
|---|---|
| Skimmed Milk Powder | 400 g |
| Lactose | 200 g |
| Saccharose | 560 g |
| Lactase Preparation ("Lactozym" ® 1500 L) | 8 g |
| Emulsifying/Stabilizing Combination ("PANISOL" PI SUPER) | 24 g |
| Water | 2688 g |

The mixture was kept at a temperature of about 40° C. for about 2 hours with slow stirring, heated to about 50° C., 120 g of butter (water content 16%) was added, the mixture was heated to about 70° C. and homogenized in a one-stage homogenizer at a pressure of about 230 kg/cm². The homogenized mixture was cooled to about 4° C. and kept at this temperature for about 6 hours. Then the mixture was frozen at about −4° C. and at the same time air was whipped in. Thereafter the mixture was hardened at about −20° to −30° C.

An ice cream was produced, the quality of which was evaluated by a trained tasting panel. A marking scale from 1 to 5 was used, according to which 5 covered the desired quality found in milk ice cream. The milk ice cream produced got the mark 5+, where + indicates an upward direction.

When using the above described process, however, instead of butter using a corresponding quantity of vegetable fats (soya/coconut oil hardened to 42° C.) and by using a homogenizing pressure of 210 kg/cm² an ice cream was produced, which by the tasting panel got the mark 5+.

COMPARATIVE EXAMPLE 2

A mixture was prepared of the following ingredients:

| | |
|---|---|
| Butter (water content 16%) | 120 g |
| Skimmed Milk Powder | 480 g |
| Saccharose | 560 g |
| Dextrose | 120 g |
| Emulsifying/Stabilizing Combination ("PANISOL" PI SUPER) | 24 g |
| Water | 2696 g |

The mixture was heated to a temperature of about 70° C. and homogenized in a one-stage homogenizer at a pressure of about 230 kg/cm². The homogenized mixture was cooled to about 4° C. and kept at this temperature for about 6 hours. Then the mixture was frozen at about −4° C. and at the same time air was whipped in. Thereafter the mixture was hardened to about −20° to −30° C.

An ice cream was produced, which by the tasting panel got the mark 2-3, which means that it was rather sandy, but acceptable milk ice cream.

When using the above described process, however, instead of butter using a corresponding quantity of vegetable fats (soya/coconut oil hardened to 42° C.) and by using a homogenizing pressure of 210 kg/cm², an ice cream was produced, which by the tasting panel got the mark 2-3, corresponding to a rather sandy but acceptable product.

I claim:

1. A process for the production of ice cream and milk ice cream which per 100 parts by weight of the ice cream comprises mixing 4-10 parts of lactose and 4-10 parts of milk solids non-fat, with lactase, sugars, stabilizer, emulsifier and water, then holding the resulting mixture under conditions suited to enzymatic hydrolysis of lactose until at least about 50% of the lactose in the mixture has been hydrolyzed, thereafter adding 3-12.5 parts of edible fat, the lactase, sugars, stabilizer, emulsifier and water being the balance by weight of said hundred parts, then pasteurizing followed by homogenizing and subsequently freezing and thereafter hardening.

2. The process of claim 1 wherein said mixture is held at 30°-50° C. for 1-3 hours.

3. The process of claim 2 wherein the mixture is held at 40° C. for about 2 hours.

4. A composition for use in the production of ice cream and milk ice cream comprising 80-90% by weight of lactose, 8-18% by weight of stabilizer/emulsifier and optionally 1% by weight of lactase, calculated on the total weight of the composition.

5. The product produced by the process of claim 1.

* * * * *